(12) United States Patent
Numata (10) Patent No.: US 12,247,955 B2
(45) Date of Patent: Mar. 11, 2025

(54) MATERIAL TESTING MACHINE

(71) Applicant: SHIMADZU CORPORATION, Kyoto (JP)

(72) Inventor: Shusuke Numata, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 241 days.

(21) Appl. No.: 17/866,544

(22) Filed: Jul. 17, 2022

(65) Prior Publication Data

US 2023/0025483 A1    Jan. 26, 2023

(30) Foreign Application Priority Data

Jul. 21, 2021 (JP) .................. 2021-120498

(51) Int. Cl.
| | |
|---|---|
| *G01N 3/10* | (2006.01) |
| *F16C 32/06* | (2006.01) |
| *G01M 5/00* | (2006.01) |
| *G01N 3/36* | (2006.01) |

(52) U.S. Cl.
CPC ............ *G01N 3/10* (2013.01); *F16C 32/0618* (2013.01); *F16C 32/0622* (2013.01); *F16C 32/0625* (2013.01); *G01M 5/005* (2013.01); *G01N 3/36* (2013.01); *G01N 2203/0003* (2013.01); *G01N 2203/0016* (2013.01); *G01N 2203/0042* (2013.01); *G01N 2203/0411* (2013.01)

(58) Field of Classification Search
CPC .... G01N 3/10; G01N 3/36; G01N 2203/0003; G01N 2203/0016; G01N 2203/0042; G01N 2203/0411; F16C 32/0618; F16C 32/0622; F16C 32/0625; G01M 5/005
See application file for complete search history.

(56) References Cited

U.S. PATENT DOCUMENTS

| | | | |
|---|---|---|---|
| 11,143,580 B2 * | 10/2021 | Takii ................ | G01N 3/32 |
| 2017/0016802 A1 * | 1/2017 | Brucke ............. | G01M 7/02 |
| 2019/0107471 A1 * | 4/2019 | Alstrin ............. | G01N 3/32 |
| 2021/0356353 A1 * | 11/2021 | Lim .................. | G10K 9/04 |

FOREIGN PATENT DOCUMENTS

| | | | | |
|---|---|---|---|---|
| CN | 1369582 A | * | 9/2002 | ........ D01H 4/12 |
| CN | 110057582 A | * | 7/2019 | ........ G01M 13/04 |
| JP | 01197627 A | * | 8/1989 | |
| JP | 03200046 A | * | 9/1991 | |
| JP | 04301188 A | * | 10/1992 | |
| JP | H0821789 A | * | 1/1996 | |
| JP | 10062327 A | * | 3/1998 | |
| JP | 2010127797 A | * | 6/2010 | |

(Continued)

OTHER PUBLICATIONS

CN-110057582-A, English Translation (Year: 2019).*

(Continued)

*Primary Examiner* — Ryan D Walsh
(74) *Attorney, Agent, or Firm* — JCIPRNET (57) ABSTRACT

In a material testing machine including a load actuator including a shaft configured to make a linear motion, and configured to apply a load to a test piece through the linear motion of the shaft, the load actuator includes a bearing configured to support the shaft, and the bearing serves as an air bearing.

3 Claims, 6 Drawing Sheets

(56) References Cited

FOREIGN PATENT DOCUMENTS

JP        2013224873     10/2013
KR    20070041194 A   *   4/2007

OTHER PUBLICATIONS

CN-1369582-A, English Translation (Year: 2019).*
JP-01197627-A, English Translation (Year: 1989).*
JP-04301188-A, English Translation (Year: 1992).*
JP-10062327-A, English Translation (Year: 1998).*
JP-2010127797-A, English Translation (Year: 2010).*
KR-20070041194-A, English Translation (Year: 2007).*
JP-03200046-A, English Translation (Year: 1991).*
JP_H0821789_A English Translation (Year: 1996).*
Office Action of Japan Counterpart Application, with English translation thereof, issued on Apr. 30, 2024, pp. 1-9.

* cited by examiner

MATERIAL TESTING MACHINE

INCORPORATION BY REFERENCE

The present application claims priority under 35 U.S.C. § 119 to Japanese Patent Application No. 2021-120498 filed on Jul. 21, 2021. The content of the application is incorporated herein by reference in its entirety.

BACKGROUND

Technical Field

The present invention relates to a material testing machine.

Related Art

In a material testing machine including a load actuator for linearly driving a shaft, a fixing jig for fixing a sample piece, and a load jig for fixing a load member that abuts the sample piece to apply a load to the sample piece, and the shaft of the load actuator is caused to make a linear motion to cause the load member to abut the sample piece and apply the load to the sample piece, there is a device to be fixed to the fixing jig in a state in which the sample piece is inclined with respect to a load direction (see, for example, JP 2013-224873 A).

In such a material testing machine, component force is generated in a direction different from the load direction due to an inclination of the sample piece, and this component force acts on the load actuator. Hence, in the material testing machine of JP 2013-224873 A, the load jig is configured to be movable in a direction orthogonal to the load direction when the component force is generated, and the component force that acts on the load actuator is reduced by the movement of the load jig.

SUMMARY

When even a small amount of force in a direction intersecting a linear motion direction of the shaft acts on the load actuator, however, frictional resistance occurs in the linear motion of the shaft of the load actuator. In a test demanding high accuracy, there is an issue that the influence caused by this frictional resistance cannot be ignored.

The present invention has an object to provide a material testing machine that enables a highly accurate test, even when force in a direction intersecting a linear motion direction of a shaft acts on a load actuator.

A first aspect of the present invention relates to a material testing machine including: a load actuator including a shaft configured to make a linear motion, and configured to apply a load to a test piece through the linear motion of the shaft, in which the load actuator includes a bearing configured to support the shaft, and the bearing serves as an air bearing.

According to the first aspect of the present invention, even when force in a direction intersecting a linear motion direction of a shaft acts on a load actuator, a highly accurate test is enabled.

DETAILED DESCRIPTION

Hereinafter, embodiments of the present invention will be described with reference to the drawings.

Figure 1:
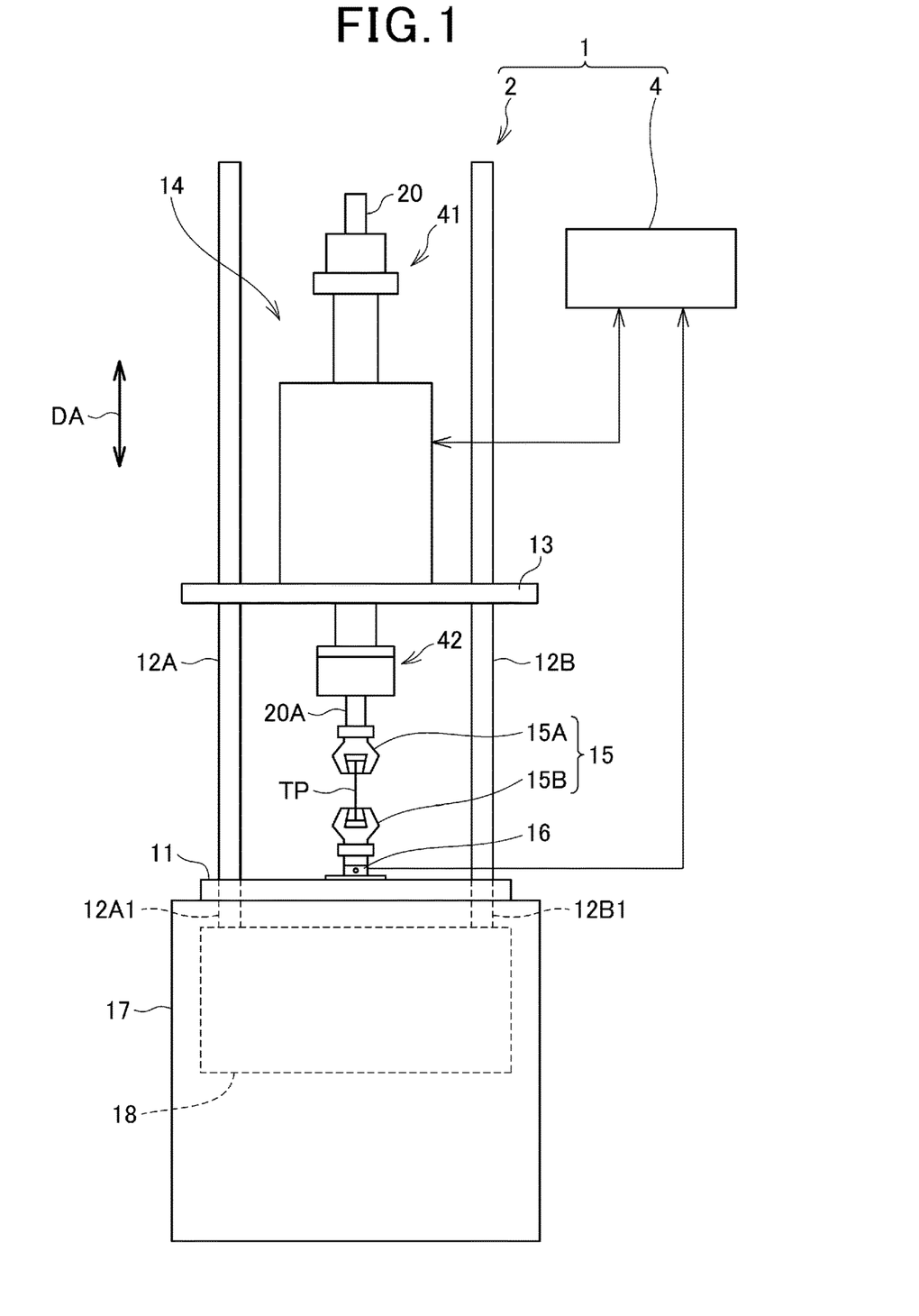
FIG. 1 is a diagram illustrating a configuration of a material testing machine according to an embodiment of the present invention.

FIG. 1 is a diagram illustrating a configuration of a material testing machine 1 according to the present embodiment.

The material testing machine 1 includes a testing machine body 2 that applies a load (also referred to as "test force") to a test piece TP (also referred to as a "sample piece"), and a control device 4 that controls the testing machine body 2.

The testing machine body 2 includes a table 11, two support columns 12A and 12B vertically stand upright on the table 11, a crosshead 13 extending in a direction orthogonal to the support columns 12A and 12B and having both end portions supported by the support columns 12A and 12B, and a load actuator 14 that applies a load to the test piece TP arranged between the table 11 and the crosshead 13.

The table 11, the support columns 12A and 12B, and the crosshead 13 constitute a load frame, and the load actuator 14 is disposed on the crosshead 13, which is a part of the load frame. In addition, the testing machine body 2 includes a fixing jig 15 that fixes the test piece TP, and a load cell 16 that detects a load being applied to the test piece TP. The fixing jig 15 is fixed to the table 11 through the load cell 16 at a position below the load actuator 14.

Note that the load cell 16 may be fixed to the load actuator 14. In this case, the load cell 16 is disposed between a shaft 20, which makes a linear motion, and which will be described later, and the fixing jig 15.

In addition, in the testing machine body 2, the load actuator 14 may be disposed on the table 11, and the load cell 16 may be disposed on the crosshead 13.

The table 11 is a flat plate placed on a pedestal 17 having a box shape, and a lift actuator 18 that lifts up and down the crosshead 13 along the support columns 12A and 12B is accommodated inside the pedestal 17.

The lift actuator 18 in the present embodiment includes a servomotor that is a drive source, and a transmission mechanism that transmits an output of the servomotor to lower end portions 12A1 and 12B1 of the support columns 12A and 12B and that rotates the support columns 12A and 12B. The support columns 12A and 12B are screw rods, and both end portions of the crosshead 13 are screwed with the support columns 12A and 12B. Then, the support columns 12A and 12B are rotationally actuated by the lift actuator 18, so the crosshead 13 is lifted up and down. For example, a height position of the crosshead 13 is changed depending on the size of the test piece TP. Note that the lift actuator 18 may include, for example, a hydraulic or pneumatic cylinder that lifts up and down the crosshead 13, or may include a handle to be manually operated so as to lift up and down the crosshead 13 in accordance with an operation of the handle.

The fixing jig 15 includes an upper gripping tool 15A to be coupled in a freely attachable manner with the load actuator 14, and a lower gripping tool 15B attached to the table 11 through the load cell 16. Such a pair of the upper gripping tool 15A and the lower gripping tool 15B grip the test piece TP from above and below.

Note that the configuration of the fixing jig 15 can be changed depending on the purpose (type) of a material test, the shape of the test piece TP, or the like. That is, the fixing jig 15 may have another configuration capable of fixing the test piece TP to the table 11 and capable of applying a load generated by the load actuator 14 to the test piece TP.

The load actuator 14 includes a shaft 20 that makes a linear motion (that is, moves up and down) in a direction DA orthogonal to the plane of the table 11, and the fixing jig 15 is coupled with a tip end 20A of the shaft 20. A specific configuration of the load actuator 14 will be described later.

The control device 4 is a computer connected with the testing machine body 2 so as to be capable of transmitting and receiving data. Such a computer includes a processor such as a central processing unit (CPU) or a micro-processing unit (MPU), a memory such as a read only memory (ROM) or a random access memory (RAM), and an interface circuit with which the testing machine body 2 is connected to enable data communication, and the processor executes a program stored in the memory and implements various functions. This function includes at least a control function for controlling the operation of the testing machine body 2 and an arithmetic operation function for performing an arithmetic operation for a test result.

That is, the control device 4 outputs a drive signal to the load actuator 14 at the time of the material test to control driving of the load actuator 14, and causes the shaft 20 to make a linear motion in a vertical direction DA and apply a load to the test piece TP fixed to the fixing jig 15. In this case, the control device 4 outputs the drive signal for driving the load actuator 14 so that a load in a mode corresponding to a purpose of the material test is applied to the test piece TP. For example, in a case where the material test is a fatigue and durability test of the test piece TP, the control device 4 generates a drive signal for periodically driving the shaft 20 to make forward and backward motions in the vertical direction DA, and outputs the drive signal to the load actuator 14. The load actuator 14 drives the shaft 20 in accordance with the drive signal, and thus a load is repeatedly applied to the test piece TP.

When the load is applied to the test piece TP, the load cell 16 detects the load, and outputs a detection value of the load to the control device 4. Then, the control device 4 obtains a test result through the arithmetic operation, based on the detection value of the load and a stroke of the shaft 20 (deformation amount of the test piece TP).

Figure 2:
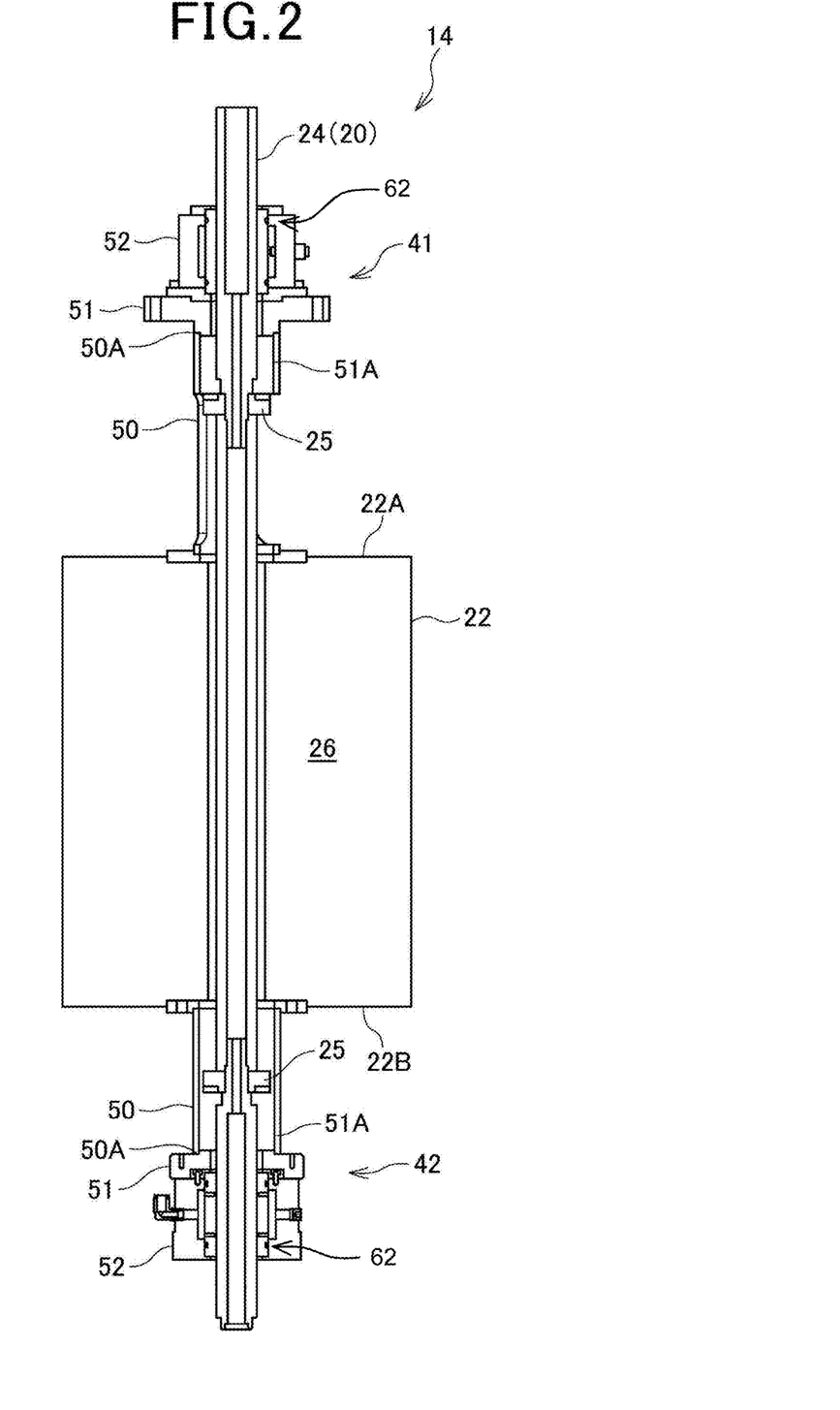
FIG. 2 is a cross-sectional view of a load actuator.

FIG. 2 is a cross-sectional view of the load actuator 14.

The load actuator 14 in the present embodiment is an electromagnetic actuator that linearly drives the shaft 20 using electromagnetic force, and is capable of controlling the load with higher accuracy than an actuator using a hydraulic cylinder or the like. As illustrated in FIG. 2, the load actuator 14 includes a casing 22 having a substantially cylindrical shape, a rod 24 that penetrates through the casing 22, and a magnetic drive unit 26 accommodated in the casing 22. The rod 24 constitutes the shaft 20, and the magnetic drive unit 26 linearly drives the rod 24, based on a drive signal of the control device 4. The load actuator 14 is provided in the testing machine body 2 in a state in which the rod 24 is parallel to the vertical direction DA, and the load actuator 14 applies a load in the vertical direction DA, which is a load direction, to the test piece TP.

The magnetic drive unit 26 includes a magnetic circuit formed with a permanent magnet or an excitation coil, a bobbin provided to be movable in the vertical direction DA with respect to the magnetic circuit and coupled with the rod 24, a coil wound around the bobbin, and a driver circuit that supplies the coil with an electric current. The driver circuit supplies the coil with the electric current, based on the drive signal of the control device 4 so as to generate a thrust on the bobbin. Such a thrust linearly drives the bobbin and the rod 24 coupled with the bobbin.

Next, a support structure of the rod 24 (shaft 20) will be described in detail.

The load actuator 14 includes a first support device 41 and a second support device 42, which support both end portions of the rod 24 that penetrates through the casing 22 to enable a vertical motion, respectively on a top surface 22A and a bottom surface 22B of the casing 22.

The first support device 41 and the second support device 42 each have a substantially identical configuration, and each include a holder 50 fixed to the top surface 22A or the bottom surface 22B of the casing 22, a rod locking tool 51 fixed to an end portion 50A of the holder 50, and a guide unit 52 fixed to the rod locking tool 51. Note that in the first support device 41, a rotation-stop mechanism that limits the rotation of the rod 24 is attached to the rod locking tool 51. The presence or absence of such an attachment structure makes a difference in shape of the rod locking tool 51 between the first support device 41 and the second support device 42.

The holder 50 is a hollow cylindrical member through which the rod 24 is inserted, and the rod locking tool 51 is a member that prevents the rod 24 from dropping off and that limits a movable range of the rod 24. To be specific, the rod locking tool 51 is a circular plate-shaped member in which a through hole 51A having a diameter smaller than the inner diameter of the holder 50 and larger than the outer diameter of the rod 24 is formed, and the rod 24 is caused to penetrate through the through hole 51A, and is fixed to the end portion 50A of the holder 50 by welding. On the other hand, stoppers 25 each having a flange shape are provided on the rod 24 at two positions on the shaft, and each stopper 25 is engaged with the rod locking tool 51, so that the rod 24 cannot drop off, and the movable range is limited.

Figure 3:
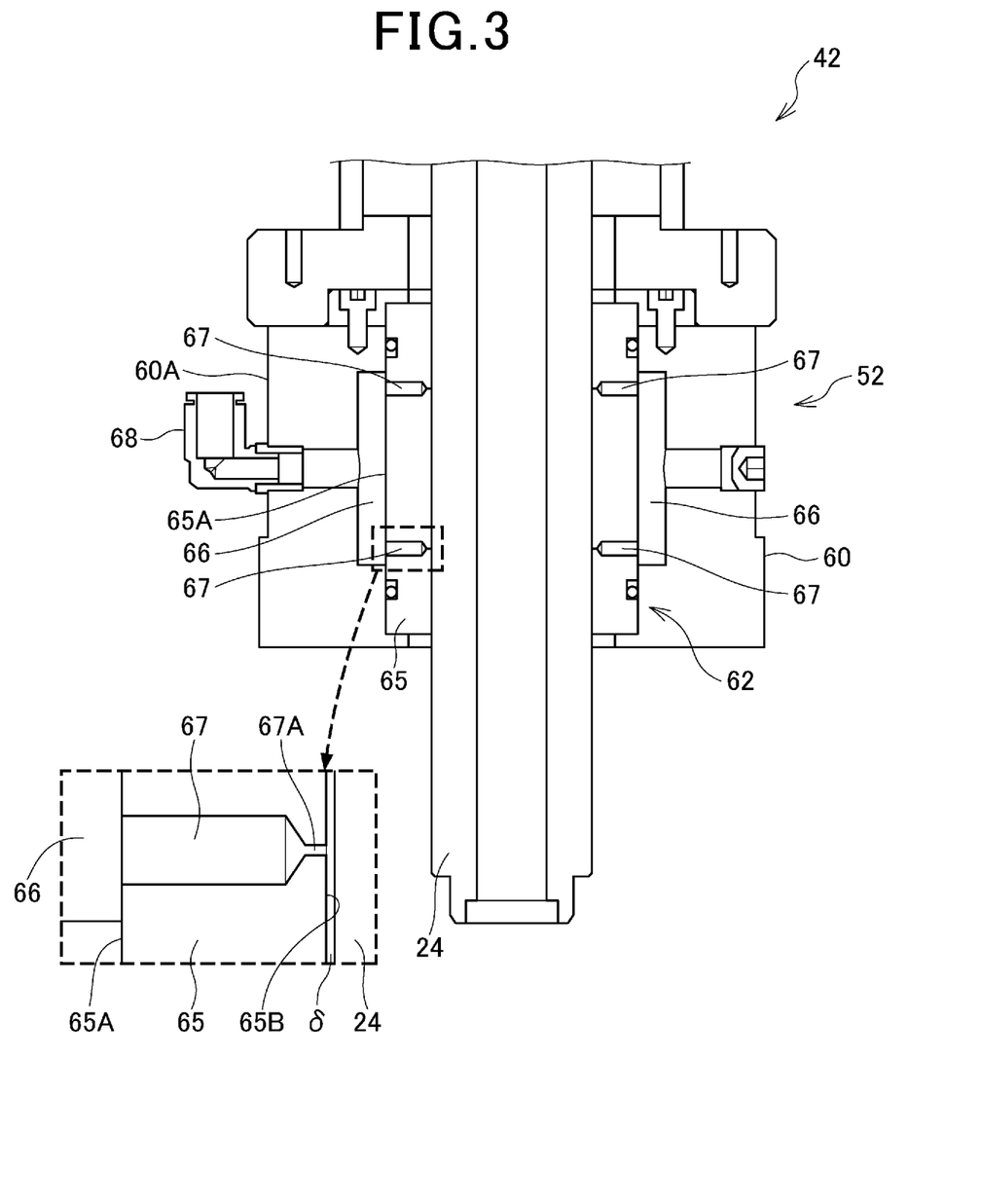
FIG. 3 is an enlarged view of a guide unit of a second support device in FIG. 2.

FIG. 3 is an enlarged view of the guide unit 52 of the second support device 42 in FIG. 2.

The guide unit 52 is a device that guides the linear motion of the rod 24, and includes a cylindrical case 60 through which the rod 24 penetrates, and a bearing 62 that is provided inside the case 60 and that supports the rod 24. The bearing 62 is a static pressure type air bearing, which is one type of fluid bearing. The air bearing is also one type of sliding bearing in which air is used as a working fluid. Such a bearing 62 includes a sleeve 65, which is a cylindrical member surrounding the shaft of the rod 24 with a slight gap δ from the rod 24, and supports the rod 24 with the air pressure of such a gap δ. More specifically, the guide unit 52 includes an air chamber 66, which is sealed and into which air flows from the outside, between the case 60 and the sleeve 65. A plurality of minute throttle holes 67A for communicating between the air chamber 66 and the gap δ through supply bores 67 are opened on a bearing surface 65B of the sleeve 65. The air chamber 66 is a space formed inside the case 60 over the entire circumference of an outer surface 65A of the sleeve 65. A connector 68 provided on an outer surface 60A of the case 60 communicates with the air chamber 66, and compressed air that has been compressed by an external compressor is supplied from the connector 68 to the air chamber 66. The supply bores 67 each have a substantially cylindrical shape extending in a radial direction of the sleeve 65, and are formed at a predetermined interval in a circumferential direction of the sleeve 65. In addition, one or a plurality of rows (two rows in the illustrated example) of the supply bores 67, which are arranged in the circumferential direction, are also formed in the axial direction of the sleeve 65. The throttle holes 67A are each a through hole provided at a tip end of each supply bore 67 on the gap δ side and having a diameter much smaller than that of the supply bore 67. The compressed air that flows into the supply bore 67 from the air chamber 66 is throttled by the throttle hole 67A, so that the air pressure of the gap δ is increased and the rigidity of the bearing 62 is increased.

In this manner, the bearings 62 of the guide units 52 of the first support device 41 and the second support device 42 are air bearings, and thus the rod 24 is supported by the bearings 62 in a non-contact state, and an occurrence of frictional resistance between the rod 24 and the bearings 62 is suppressed.

Further, when a load is applied to the test piece TP, even in a case where the force in a direction intersecting the linear motion direction of the rod 24 (hereinafter, referred to as "lateral force") acts on the rod 24, the air pressure in the gap δ between the rod 24 and the bearing 62 is maintained at high pressure, so that the contact between the rod 24 and the bearing 62 is prevented, and the non-contact state is maintained. Accordingly, even when the lateral force acts on the rod 24, the occurrence of the frictional resistance is suppressed.

Here, examples of the throttle type of the throttle hole 67A include a porous throttle in which the sleeve 65 is formed with a porous material to uniformly distributes the throttle hole 67A over the entire bearing surface 65B of the sleeve 65, a self-contained throttle in which the diameter of the supply bore 67 itself is made to be small, an orifice throttle in which a pocket is provided at a tip end of the supply bore 67, a surface throttle in which an extremely shallow dent connected with the supply bore 67 is dug on the bearing surface 65B of the sleeve 65 and fluid resistance functions as throttling when air flows in the recess, and the like.

Among these throttles, the porous throttle has the highest bearing performance. However, in the porous throttle, the gap δ has a size of several μm order, and is the smallest among these throttles. For this reason, in the load actuator 14 including the first support device 41 and the second support device 42 at both ends of the rod 24, it is very difficult to align the positions of the gaps δ between the first support device 41 and the second support device 42 with each other in the radial direction of the rod 24, and the rod 24 easily comes into contact with the bearing 62 at either the first support device 41 or the second support device 42, when the rod 24 makes a linear motion.

On the other hand, in the self-contained throttle and the orifice throttle, the gap δ is larger than that of the porous throttle, and has a size of ten to several tens μm order. Therefore, the self-contained throttle or the orifice throttle is used for the throttle hole 67A, so that the positions of the gaps δ can be easily aligned between the first support device 41 and the second support device 42, and contact of the rod 24 can be prevented when the rod 24 makes a linear motion. For the throttle hole 67A in the present embodiment, a self-contained throttle excellent in workability and cost is used.

Figure 4:
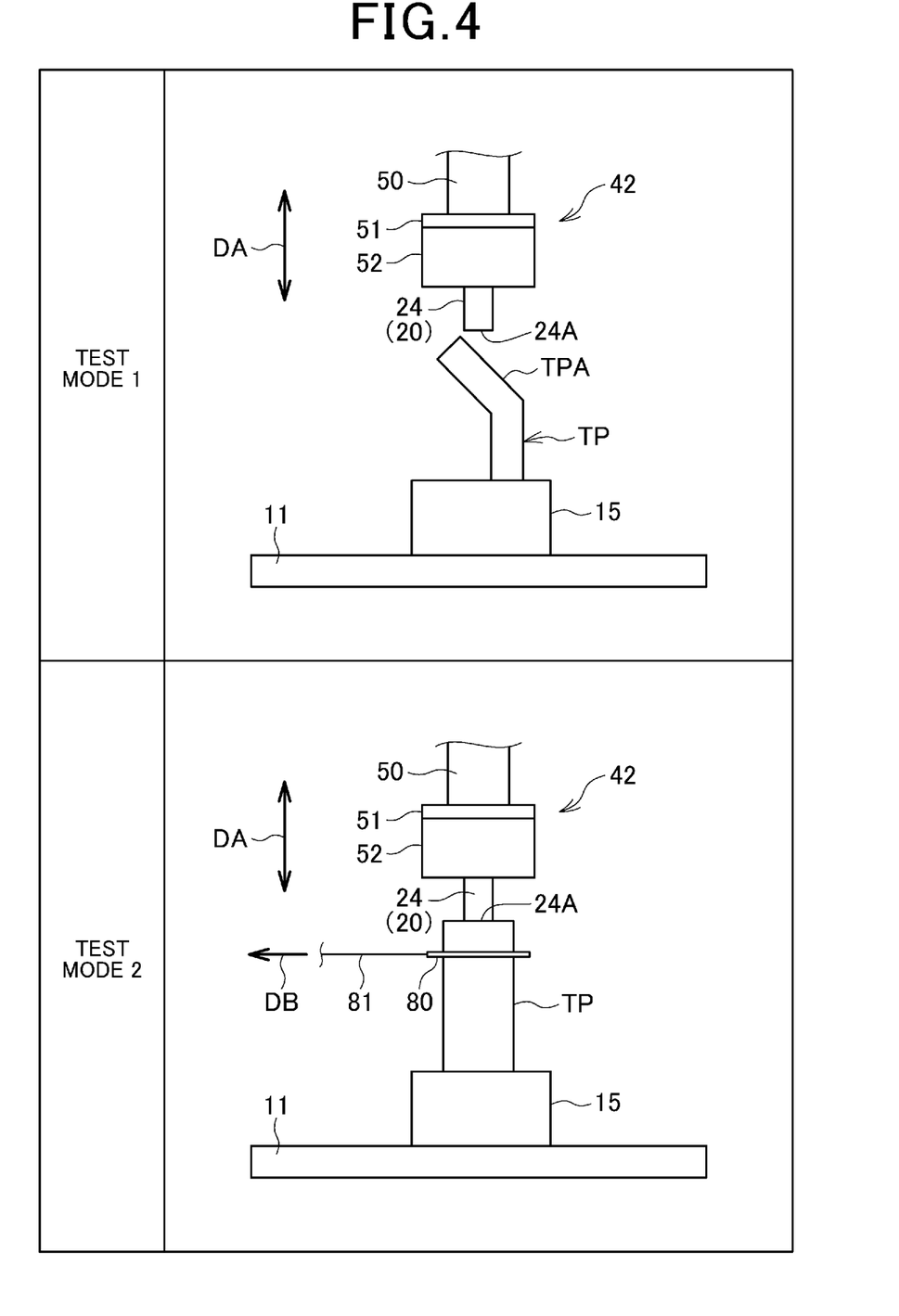
FIG. 4 is a diagram illustrating examples of test modes in which lateral force acts on a rod of the load actuator.

FIG. 4 is a diagram illustrating examples of test modes in which the lateral force can act on the rod 24 of the load actuator 14.

A test mode 1 is a test in which the test piece TP includes an inclined surface TPA inclined with respect to the linear motion direction (vertical direction DA) of the rod 24, a tip end 24A of the rod 24 (a tip end of the shaft 20) is caused to abut the inclined surface TPA repeatedly at a predetermined cycle to apply a load, and deformation of the test piece TP is measured.

A test mode 2 is a test in which a ring member 80 is attached to the test piece TP (for example, a shock absorber) capable of expanding and contracting in the vertical direction DA, the tip end 24A of the rod 24 (tip end of the shaft 20) is caused to abut the inclined surface TPA repeatedly at a predetermined cycle to apply a load, in a state in which the ring member 80 is pulled by a wire 81 in a horizontal direction DB to exert the lateral force in the horizontal direction DB on the test piece TP, and sliding resistance or the like at the time of expansion and contraction of the test piece TP is measured.

In both the test mode 1 and the test mode 2, when the linear motion of the rod 24 of the load actuator 14 applies the load to the test piece TP, its reaction force including a component of the lateral force acts on the rod 24.

Figure 5:
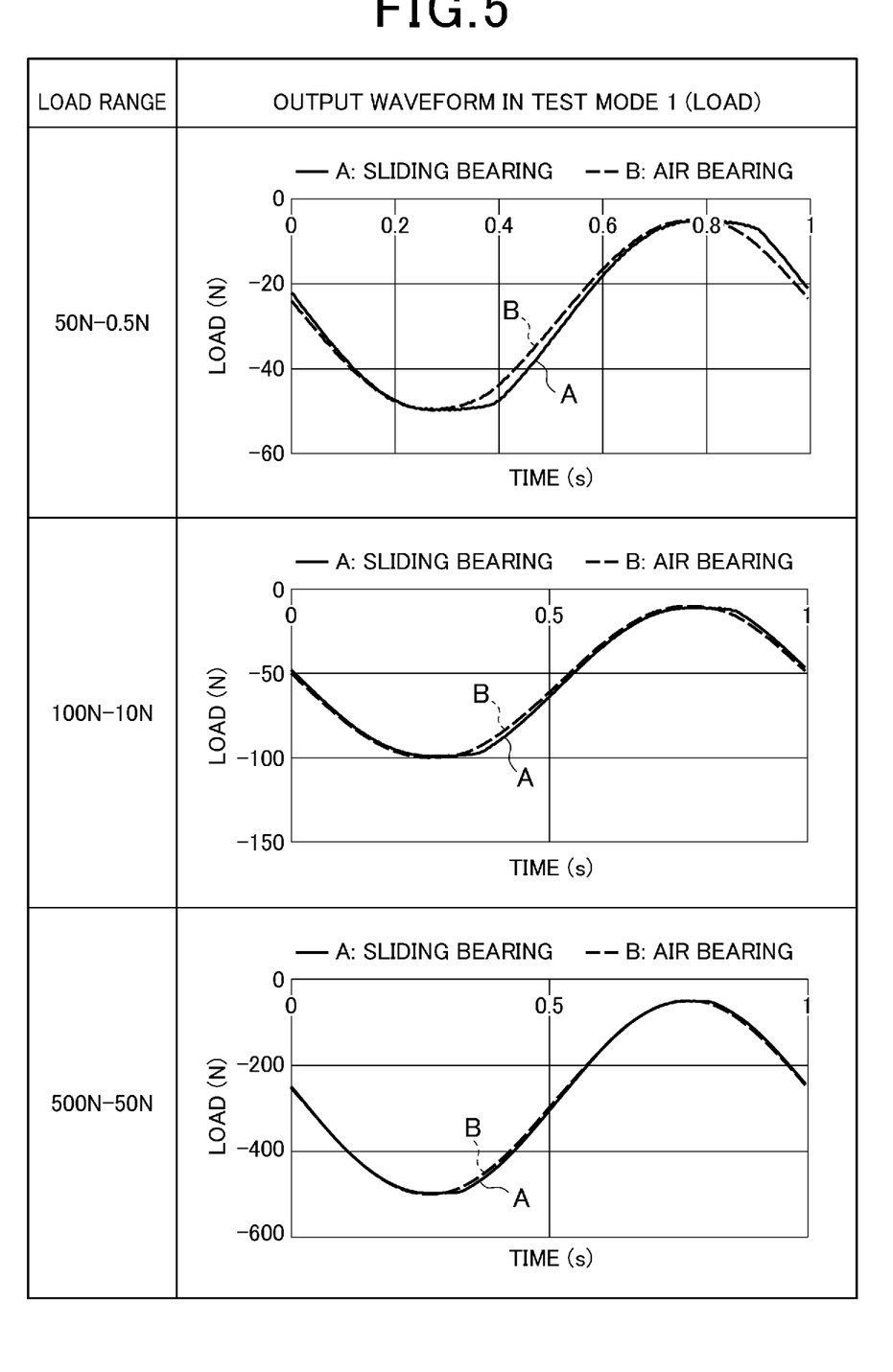
FIG. 5 is a diagram illustrating examples of an output waveform of a testing machine body in a test mode 1.

FIG. 5 is a diagram illustrating examples of an output waveform of the testing machine body 2 in the test mode 1.

The output waveforms illustrated in the drawing are each a waveform output from the load cell 16 included in the testing machine body 2, and indicate detection values of the load being applied to the test piece TP by the rod 24.

In the test mode 1, a drive signal having a sinusoidal waveform of a predetermined frequency is input to the magnetic drive unit 26 of the load actuator 14, and a stroke (displacement amount) at the time of linear motion of the rod 24 also changes in a sinusoidal waveform. The load is applied to the test piece TP by such a rod 24, and the detection values of the test force also change in a sinusoidal waveform.

In the test mode 1, however, the lateral force acts on the rod 24. Hence, in a case where the bearing 62 of the load actuator 14 is a sliding bearing, the frictional resistance between the rod 24 and the sliding bearing affects the linear motion of the rod 24. As a result, a distortion occurs in the sinusoidal waveform of the detection values (line A) of the load, the load is not appropriately applied, and the test is affected. In particular, the distortion in the output waveform of the detection values (line A) of the load becomes more remarkable, as the load becomes weaker, and the frictional resistance affects more in the output waveform, as the load becomes weaker.

On the other hand, in a case where the bearing 62 is an air bearing, the rod 24 and the bearing 62 maintained in a non-contact state suppresses the occurrence of the frictional resistance. Therefore, even when the load is weak, the distortion in the waveform of the detection values (line B) of the load is suppressed.

Figure 6:
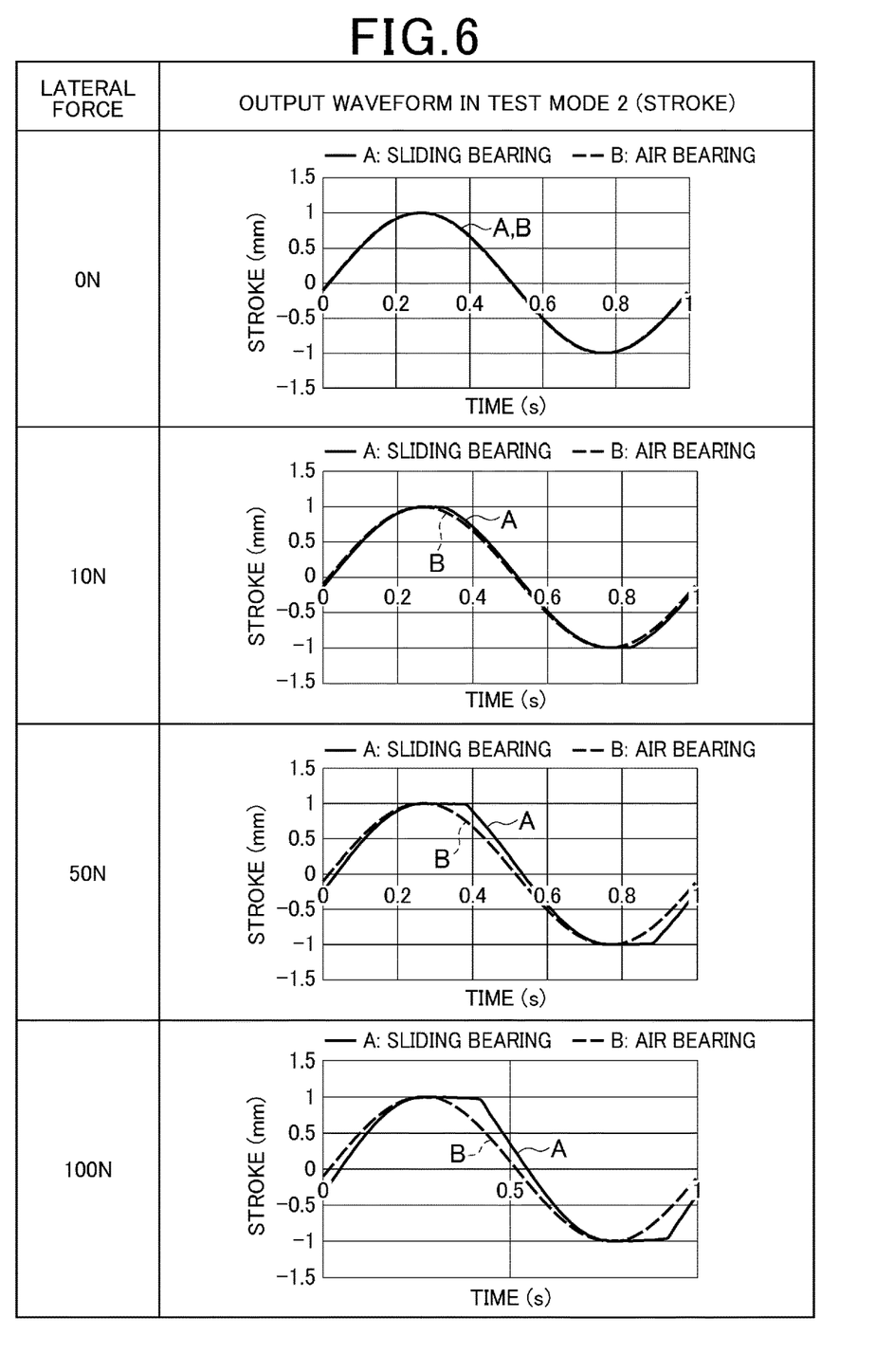
FIG. 6 is a diagram illustrating examples of the output waveform of the testing machine body in a test mode 2.

FIG. 6 is a diagram illustrating examples of output waveforms of the testing machine body 2 in the test mode 2.

The output waveforms illustrated in the drawing are each a waveform output from the load actuator 14 included in the testing machine body 2, and indicate output waveforms of a sensor that detects the stroke of the rod 24. In the testing machine body 2, such a sensor is attached in the vicinity of an upper end portion of the rod 24 in the load actuator 14 so as to be capable of detecting a vertical motion of the rod 24.

In the test mode 2, similarly to the test mode 1, a drive signal having a sinusoidal waveform of a predetermined frequency is input to the magnetic drive unit 26 of the load actuator 14, and the stroke of the rod 24 to the test piece TP side also changes in a sinusoidal waveform. A deformation in the expansion and contraction of the test piece TP also changes in a sinusoidal waveform.

Also in the test mode 2, however, the lateral force acts on the rod 24. Hence, in a case where the bearing 62 of the load actuator 14 is a sliding bearing, a distortion occurs in the sinusoidal waveform of the detection values (line A) of the stroke, the load is not appropriately applied, and the test is affected. In particular, the distortion in the output waveform of the detection values (line A) of the stroke becomes more remarkable, as the lateral force that pulls the test piece TP is stronger.

On the other hand, in a case where the bearing 62 is an air bearing, even when the lateral force that pulls the test piece TP is strong, the rod 24 and the bearing 62 maintained in the non-contact state suppresses the occurrence of the frictional resistance. The distortion in the waveform of the detection values (line B) of the stroke is suppressed.

As described above, according to the present embodiment, the following effects are obtained.

The material testing machine 1 in the present embodiment includes the load actuator 14 including the rod (shaft 20) configured to make a linear motion, and configured to apply a load to the test piece TP through the linear motion of the rod 24. In addition, the load actuator 14 includes the bearing 62 configured to support the rod 24, and the bearing 62 serves as an air bearing.

According to this configuration, even when the lateral force acts on the rod 24, the rod 24 is supported in a non-contact state by the bearing 62, so that the occurrence of frictional resistance is suppressed. Accordingly, even when the lateral force is generated, the output waveform of the material testing machine 1 is not disturbed, and a highly accurate test is enabled.

In addition to this, the occurrence of the frictional resistance in the bearing 62 is suppressed, and heat generation is also suppressed.

Furthermore, the bearing 62 is an air bearing, and thus the rod 24 is supported at a position where the force is balanced by the high-pressure gas in the gap δ. Accordingly, positioning accuracy of the axial center is enhanced more than fitting accuracy of typical bearings such as a sliding bearing and a rolling bearing.

In the material testing machine 1 in the present embodiment, the load actuator 14 includes the bearing 62 configured to support each of both end portions of the rod 24, each of the bearings 62 includes: a sleeve 65 configured to surround the rod 24; and a plurality of throttle holes 67A that open on a bearing surface 65B of the sleeve 65, and a throttle hole 67A serves as a self-contained throttle.

According to this configuration, the gap δ of the bearing 62 becomes larger than that of a case where the throttle hole 67A is a porous throttle, and the positions of the gaps δ of the bearings 62 at both end portions of the rod 24 can be easily aligned with each other. This makes it possible to prevent contact with the bearing 62, when the rod 24 makes a linear motion.

Note that the throttle hole 67A may be an orifice throttle.

In the material testing machine 1 in the present embodiment, the load actuator 14 drives the rod 24 such that a stroke of the rod 24 changes in a sinusoidal waveform.

According to this configuration, it is possible to conduct the test with the rod 24 that applies a load to the test piece TP repeatedly at a predetermined cycle. In this case, even when the lateral force acts on the rod 24 by the reaction force of the load, the rod 24 and the bearing 62 are maintained in the non-contact state. Therefore, the occurrence of frictional resistance between the rod 24 and the bearing 62 is suppressed, and the waveform of the stroke of the rod 24 becomes a sinusoidal waveform without a distortion.

In the material testing machine 1 in the present embodiment, the rod 24 of the load actuator 14 abuts an inclined surface TPA of the test piece TP, the inclined surface TPA being inclined with respect to a linear motion direction of the rod 24, or applies the load to the test piece TP in a state of expanding and contracting in the linear motion direction of the rod 24 and being exerted with lateral force.

In this configuration, the rod 24 applies a load to the inclined surface TPA of the test piece TP, or the rod 24 applies the load to the test piece TP with being exerted with the lateral force. Thus, the lateral force acts on the rod 24. However, even when the lateral force acts, the rod 24 and the bearing 62 are maintained in the non-contact state. Therefore, it is possible to conduct the test on the test piece TP with high accuracy without being affected by the frictional resistance.

Note that the above-described embodiments merely indicate examples according to one aspect of the present invention, and can be optionally modified and applied without departing from the gist of the present invention.

In the above-described embodiments, as a test conducted by the material testing machine 1, an example has been given with regard to the test in which the load actuator 14 periodically causes the rod 24 (shaft 20) to make a linear motion so as to apply a load to the test piece TP repeatedly. However, the test may be a test in which the load actuator 14 continuously pushes out the rod (shaft 20) so as to continuously apply a load to the test piece TP.

In the above-described embodiments, an example has been given with regard to the case where the bearing 62 is an air bearing. However, the bearing 62 may be a fluid bearing using a liquid as a fluid. In this case, the bearing 62 is provided with a countermeasure against liquid leakage.

In the above-described embodiments, the material testing machine 1 may have a configuration to apply a load to the test piece TP by lifting (moving) up and down the crosshead 13. In this configuration, an air bearing is used as a bearing of an actuator that drives the crosshead 13. However, in this configuration, the force exerted on the bearing is larger than the force exerted on the bearing 62 in the above-described embodiments. Therefore, safety can be enhanced by using a dry bearing in combination as the bearing of the actuator.

In addition, directions such as horizontal and vertical directions, various numerical values, shapes, and materials in the above-described embodiments include a range (so-called equivalent range) in which the same functions and effects as those of the directions, numerical values, shapes, and materials are exhibited, unless otherwise specified.

[Aspects]

It is understood by those skilled in the art that the exemplary embodiments described above are specific examples of the following aspects.

(Section 1) A material testing machine according to one aspect includes a load actuator including a shaft configured to make a linear motion, and configured to apply a load to a test piece through the linear motion of the shaft, in which the load actuator includes a bearing configured to support the shaft, and the bearing serves as an air bearing.

According to the material testing machine described in Section 1, even when the force in a direction intersecting the linear motion direction of the shaft acts on the load actuator, a highly accurate test is enabled.

(Section 2) In the material testing machine described in Section 1, the load actuator may include the bearing configured to support each of both end portions of the shaft, each of the bearings may include: a sleeve configured to surround the shaft; and a plurality of throttle holes that open on a bearing surface of the sleeve, and a throttle hole may serve as either a self-contained throttle or an orifice throttle.

According to the material testing machine described in Section 2, the respective positions of the gaps in the bearings at both end portions of the shaft can be easily aligned.

(Section 3) In the material testing machine described in Section 1 or 2, the load actuator may drive the shaft such that a stroke of the shaft changes in a sinusoidal waveform.

According to the material testing machine described in Section 3, even when the force intersecting the linear motion direction acts on the shaft, the waveform of the stroke of the shaft can be maintained in a sinusoidal waveform without a distortion.

(Section 4) In the material testing machine described in one of Sections 1 to 3, a shaft of the load actuator may abut an inclined surface of the test piece, the inclined surface being inclined with respect to a linear motion direction of the shaft, or may apply the load to the test piece in a state of expanding and contracting in the linear motion direction of the shaft and being exerted with force in a direction intersecting the linear motion direction.

In the material testing machine described in Section 4, the shaft applies the load to the inclined surface of the test piece, or applies the load to the test piece in a state of being exerted with the lateral force, and thus the lateral force acts on the shaft. However, even when the lateral force acts, the shaft and the bearing are maintained in a non-contact state. Therefore, it is possible to conduct the test on the test piece with high accuracy without being affected by the frictional resistance.

REFERENCE SIGNS LIST

1 Material testing machine
2 Testing machine body
14 Load actuator
20 Shaft
22 Casing
24 Rod
41 First support device
42 Second support device
52 Guide unit
62 Bearing
65 Sleeve
65B Bearing surface
67A Throttle hole
DA Vertical direction (linear motion direction)
DB Horizontal direction
TP Test piece
$\delta$ Gap

What is claimed is:

1. A material testing machine comprising: a load actuator including a shaft configured to make a linear motion, and configured to apply a load to a test piece through the linear motion of the shaft, wherein
   the load actuator includes
   at least one bearing configured to support the shaft, and the at least one bearing serves as an air bearing; and
   a load mechanism, applying force to the test piece in a direction intersecting the linear motion direction of the shaft, wherein the shaft of the load actuator applies the load to the test piece in the linear motion direction of the shaft during the load mechanism applying the force to the test piece in the direction intersecting the linear motion direction of the shaft; wherein the at least one bearing includes a plurality of the bearings, the load actuator includes the plurality of the bearings configured to support each of both end portions of the shaft, respectively, each of the bearings includes: a sleeve configured to surround the shaft; and a plurality of throttle holes that open on a bearing surface of the sleeve, and a throttle hole serves as either a self-contained throttle or an orifice throttle.

2. The material testing machine according to claim 1, wherein the load actuator drives the shaft such that a stroke of the shaft changes in a sinusoidal waveform.

3. The material testing machine according to claim 1, wherein
   the shaft of the load actuator abuts an inclined surface of the test piece, the inclined surface being inclined with respect to a linear motion direction of the shaft.

* * * * *